Aug. 25, 1964  F. G. BURG  3,145,401
LEAD SCREW OPERATED TAPPING SPINDLE WITH
QUICK ACTING REVERSING MEANS
Filed July 11, 1960  4 Sheets-Sheet 2

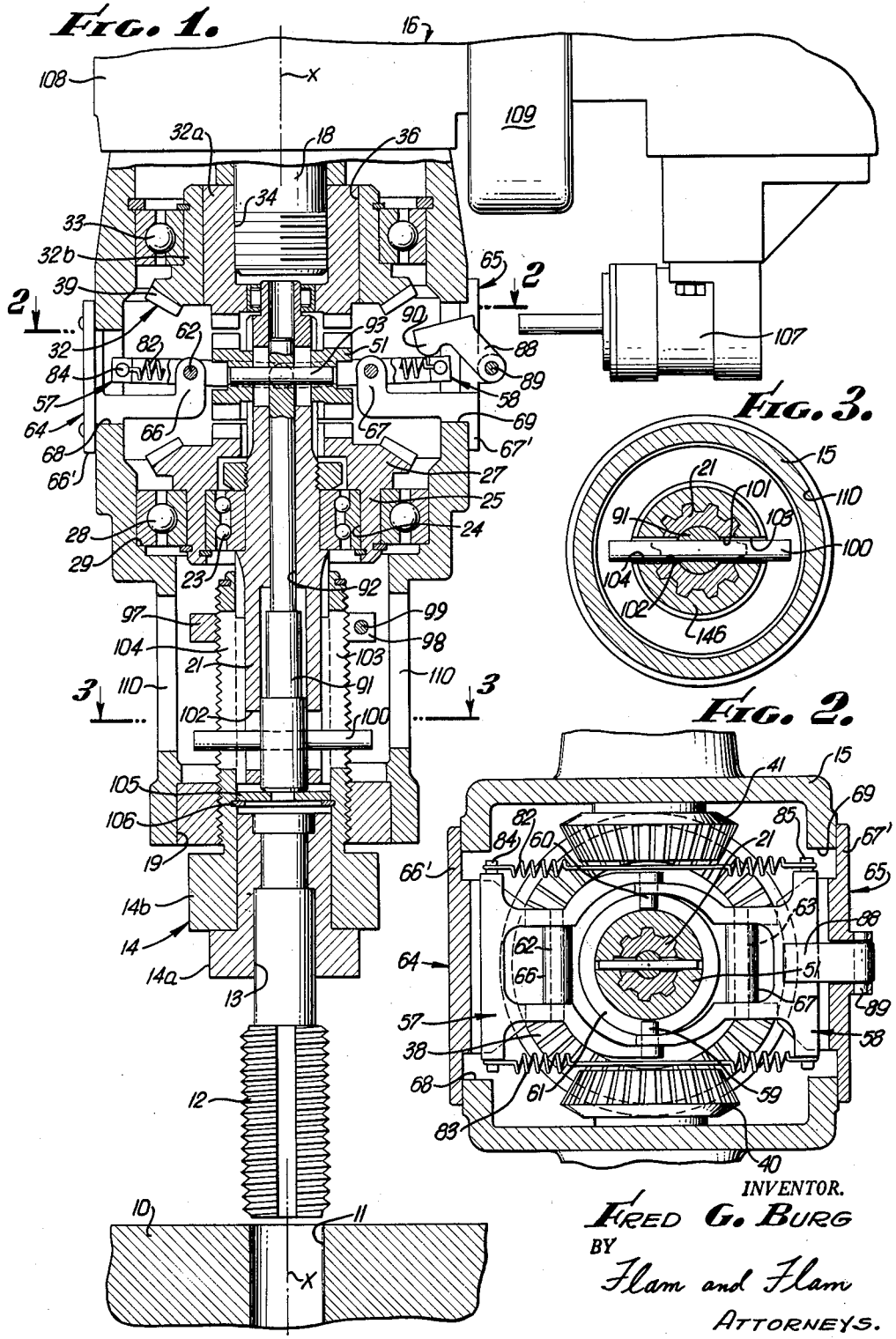

INVENTOR.
FRED G. BURG
BY
Flam and Flam
ATTORNEYS.

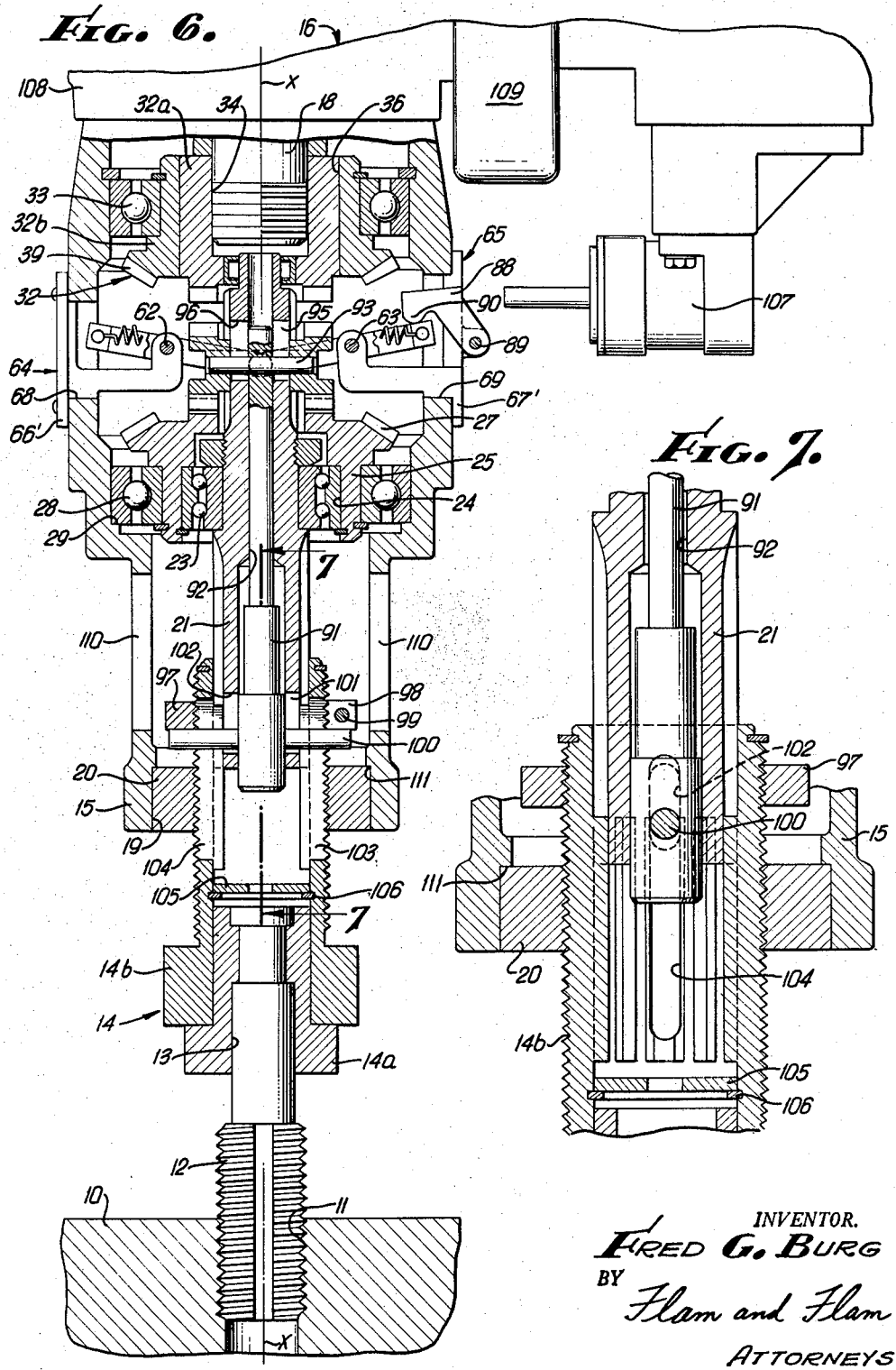

United States Patent Office 3,145,401
Patented Aug. 25, 1964

3,145,401
LEAD SCREW OPERATED TAPPING SPINDLE
WITH QUICK ACTING REVERSING MEANS
Fred G. Burg, Los Angeles, Calif., assignor to Burgmaster
Corporation, Los Angeles, Calif., a corporation of
California
Filed July 11, 1960, Ser. No. 42,032
9 Claims. (Cl. 10—137)

This invention relates to an attachment for a spindle of a machine tool adapted automatically spirally to advance and then to retract a tool holder. Such attachment may be used specifically for tapping holes in metal, or for rotating a thread cutting die.

The tool holder for a tap must spirally advance to a predetermined adjustable depth and thereupon reverse its direction of rotation and spirally retract. Various devices for accomplishing this general function have been proposed heretofore, but they have been notoriously complex. Accordingly, an object of this invention is to provide an automatic tapper that has a new and unique mode of operation effected by relatively simple and inexpensive parts.

For this purpose, use is made of a pair of opposed and coaxial oppositely rotary drive members continuously driven by the spindle. Between these oppositely rotating members a clutch, coupled to the tool holder, is movable, so as optionally to be driven by either of the drive members. A bi-stable or over-center mechanism urges the clutch in opposite directions from a central unstable balanced position. The bi-stable mechanism together with a start button and limit operating members accomplishes a cycle of operation in which the clutch is snapped by the start button from its idle or neutral position into engagement with the forward rotary drive members causing the tool to rotate in one direction, a lead screw arrangement causing the spiral movement of the tapper. An abutment carried by the tool holder later becomes effective to pull the clutch away from the corresponding drive member to and through the central unstable balanced position in which the forward drive member is yet effective; the clutch is then snapped by the bi-stable mechanism out of the engagement from the forward drive member and into engagement with the reverse drive member resulting in spiral retraction. Finally another abutment lifts the clutch until it clears the reverse drive member. At this point the clutch has stopped short of a central balanced position. Hence the cycle is completed.

To repeat the cycle, the start button must again be actuated.

Another object of this invention is to provide an automatic device of this character that incorporates simple starting means capable of manual or automatic operation.

Still another object of this invention is to provide an automatic device of this character in which the lead screw and the lead nut can readily be replaced so that different pitched threads can be formed.

Still another object of this invention is to provide a device of this character in which adjustment as to depth of travel can readily be accomplished.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principle of the invention; but it is to be understood that that detailed description is not to be taken in a limiting sense, since the scope of this invention is best defined by the appended claims.

Referring to the drawings:

FIGURE 1 is an axial sectional view of a device incorporating the present invention, the device being a neutral or inactive position;

FIG. 2 is a sectional view taken along the offset plane 2—2 of FIG. 1;

FIG. 3 is a sectional view taken along a plane indicated by line 3—3 of FIG. 1;

FIG. 6 is a view similar to FIG. 1, but illustrating the mechanism in a third position coresponding to a spiral retraction of the tool;

FIG. 7 is an enlarged sectional view taken along a plane indicated by line 7—7 of FIG. 6.

Figure 4:
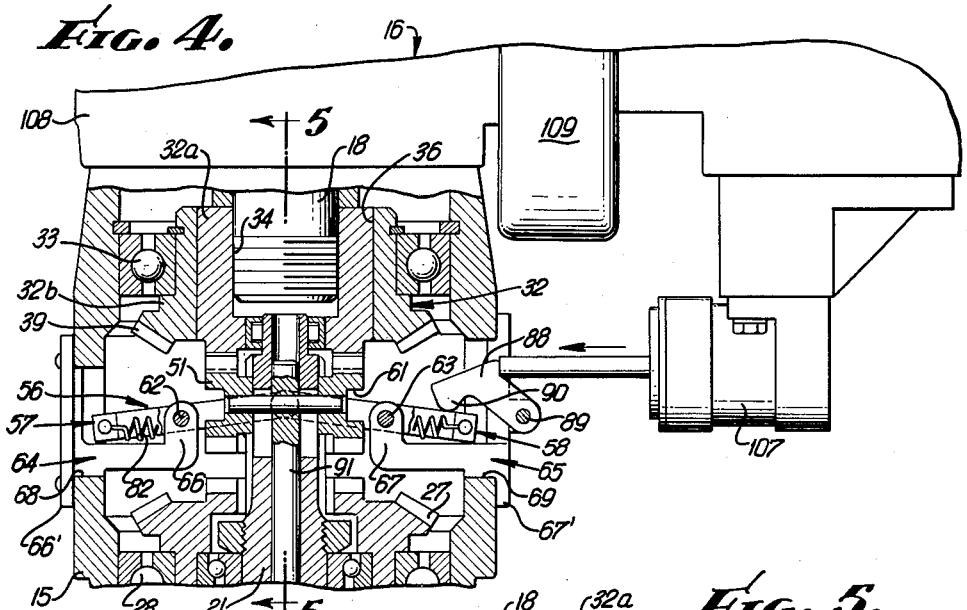
FIG. 4 is a fragmentary sectional view showing the apparatus of FIG. 1 in a different position corresponding to spiral advancement of the tool.

In FIG. 1 there is illustrated by way of example a metal work piece 10 having a hole 11 that is intended to be tapped. A tap 12 is secured in a socket 13 formed in one part 14a of a two-part tool holder 14. The other part 14b is formed as a through bored lead screw, having a head at its lower end resting against a flange of the part 14a.

The tool holder 14 is mounted at the lower open end of a hollow housing 15 for movement along the axis $x$ of the hole 11. The housing 15 is detachably secured to a frame 16 by having the edges adjacent its upper opening clamped to the frame face and about a spindle 18 that projects from the face.

The lower end of the body 15 has a opening 19 in which a replaceable lead nut 20 is accommodated and secured. (See also FIG. 7.) The lead screw 14b and the lead nut 20 engage each other. Hence, as the tool holder 14 is rotated a spiral course for the tapper 12 results corresponding to the pitch of screw 14b.

In order to rotate the holder 14, an axially fixed tool shaft 21 supported by the body 15 is provided. The tool shaft 21 as shown in FIG. 7 has its lower end spline connected to the upper end of the lead screw 14b.

Figure 5:
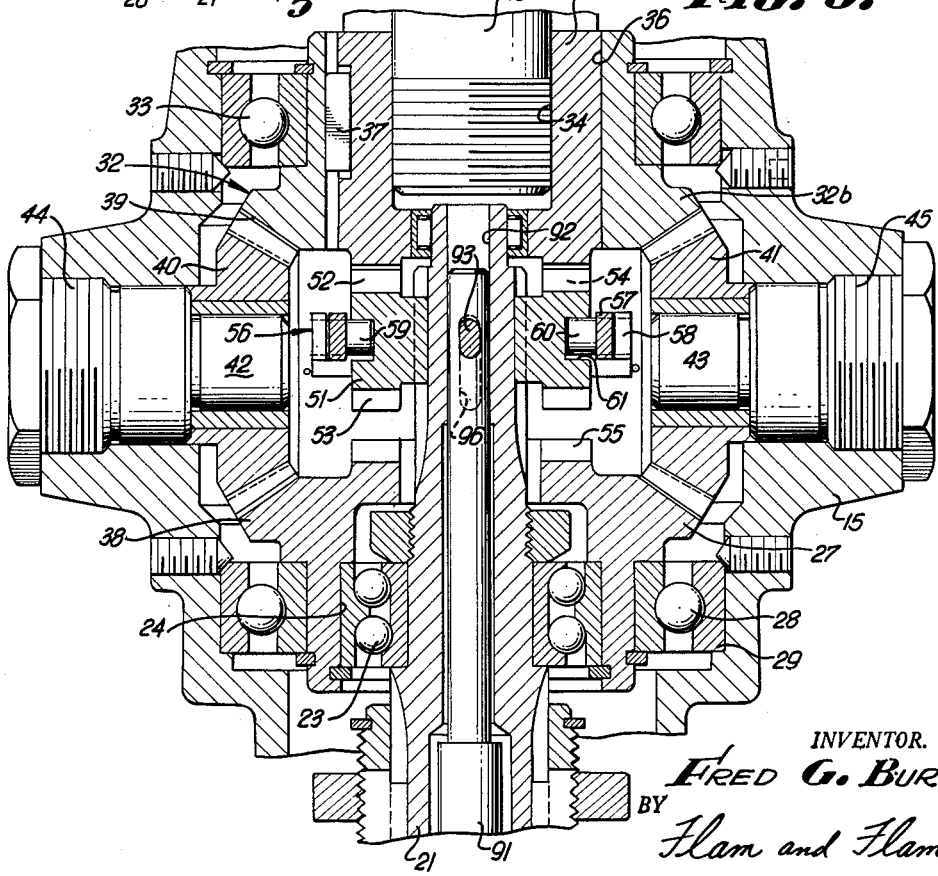
FIG. 5 is an enlarged vertical sectional view taken along a plane indicated by line 5—5 of FIG. 4.

The shaft 21 is rotatably supported by a thrust ball bearing structure (FIG. 5). The outer race of the bearing is mounted in a recess 24 at the lower end of a hub 25 of a reverse drive member 27 to be described hereinafter. The hub 25 in turn mounts a ball bearing structure 28 that rests upon an interior shoulder 29 of the body 15. This arrangement makes possible an axially compact unit. The tool shaft 21 projects upwardly through and beyond the reverse drive member 27.

A two-part forward drive member 32 is supported coaxially above the reverse drive member 27 by a bearing 33. The spindle 18 continuously rotates the drive members 27 and 32 in opposite directions corresponding to spiral advancement and spiral retraction of the tool holder 14. The spindle 18 directly drives the forward drive member by being received within an upwardly opening threaded socket 34 formed in the inner part 32a of the member 32. The upper end of the tool shaft is piloted in the lower end of the inner part 32a. The inner part 32a is accommodated in the through bore 36 of the outer part 32b. A key 37 couples the forward drive member parts 32a and 32b.

A driving connection between the spindle 18 and the reverse drive member 27 is provided by a pair of reversing gears 40 and 41 (FIGS. 2 and 5) each operating between bevel gears 38 and 39 formed on the opposed peripheral portions of the driving members 32 and 27.

The reversing gears 40 and 41 are mounted by means located entirely beyond the space between the inner portions of the drive members 27 and 32. Stub axles 42 and 43 (FIG. 5) are thus provided are mounted by screws 44 and 45 at opposite sides of the body 15.

The tool shaft 21 may be coupled either to the forward drive member 32 or the reverse drive member 27. For this purpose, a clutch 51 is provided that is splined to the upper end of the shaft 21 for axial movement. The clutch 51 has an upper face provided with circularly arrayed clutch teeth 52 and a lower face provided with circularly arrayed clutch teeth 53. Opposed inner portions of the forward and reverse drive members have clutch teeth 54 and 55 respectively cooperable with upper and lower ends of the clutch 51, as shown in FIGS. 5 and 6.

Figure 8:
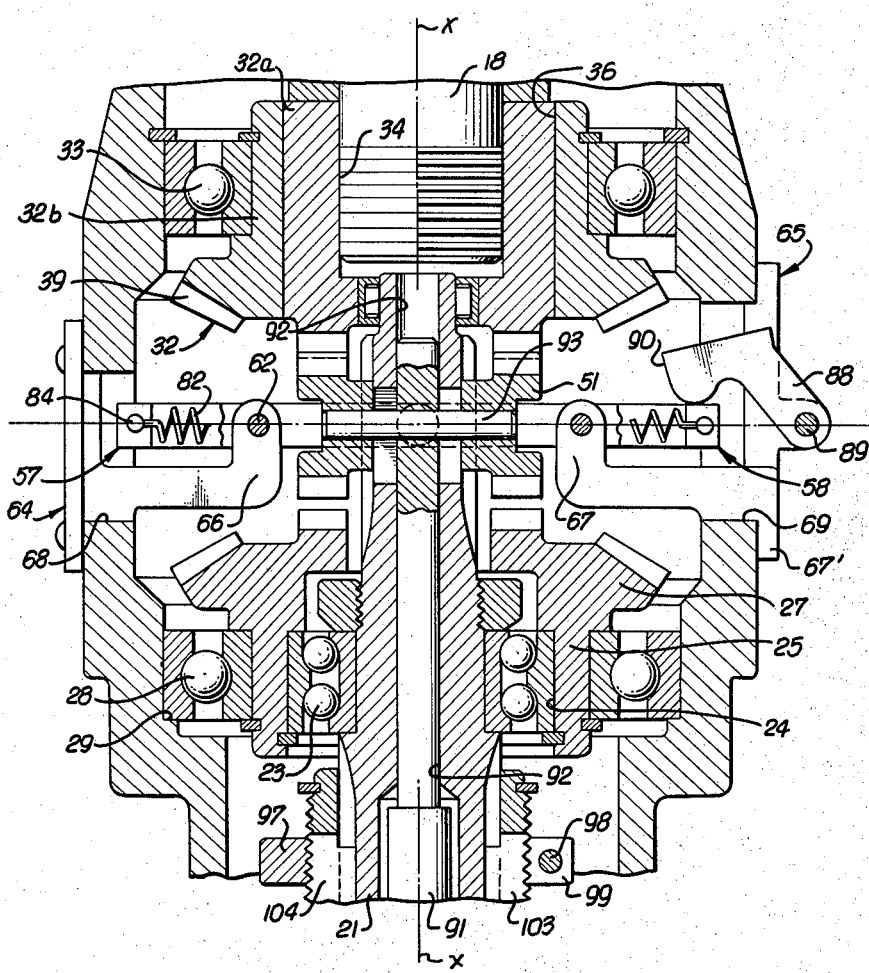
FIG. 8 is an enlarged fragmentary axial sectional view showing the apparatus in its central unstable balance position.

A bi-stable mechanism 56 urges the clutch 51 either toward the forward drive member 32 or the reverse drive member 27 from a central unstable balanced position, as shown in FIG. 8. The mechanism 56 (FIG. 2) includes two U-shaped rockers 57 and 58 that together encompass the clutch 51.

The rockers 57 and 58 have arms that over-lap each other at their inner ends, and thereat jointly mount pins 59 and 60. These pins act on diametrically opposite sides of the clutch 51 to urge the clutch upwardly or downwardly. The pins 59 and 60 thus project radially into, and ride in, a peripheral circular groove 61 of the clutch 51. The rockers are tiltably mounted so that the pins 59 and 60 translate axially of the clutch 51. For this purpose, pivot pins 62 and 63 (see also FIG. 1) are provided located between the arms of the rockers. The ends of the pins enter apertures formed in the rocker arms.

The pins 62 and 63 are mounted on opposite sides of the clutch 51 by brackets 64 and 65 having fingers 66 and 67 projecting upwardly between the arms of the respective rockers 57 and 58. The brackets 64 and 65 have plates 66' and 67' by the aid of which they are attached at openings 68 and 69 of the body 15.

A pair of tension springs 82 and 83 impose the requisite bias on the rockers 57 and 58. Ends of each spring are respectively attached to the rockers beyond the pivot pins 62 and 63. Anchor pins 84 and 85 mounted at the central connecting portions of the U-shaped rockers serve as a means of attachment for the springs 82 and 83.

When the springs 82 and 83 extend generally above the pivot pins 62 and 63, as illustrated in FIG. 6 the outer portions of the rockers 57 and 58 are urged upwardly, and the pins 59 and 60 urge the clutch 51 downwardly, and into engagement with the reverse drive member 27. When as in FIG. 4, the springs 82 and 83 lie below the pivot pins, the clutch is urged to engage the forward drive member 32. When the springs 82 and 83 are in a central intermediate position as shwon in FIG. 8, the clutch 51 is in a position of unstable equilibrium.

In FIG. 1 the device is shown in a position in which the clutch 51 is in neutral, but below the central unstable position of FIG. 8. The clutch 51 engages neither drive member. The tool holder 14 accordingly is non-rotary. The manner is which the clutch 51 is held in neutral will be hereinafter described.

To begin spiral rotation of the tool 12, the clutch 51 must be placed in engagement with the forward drive member 32. For this purpose, a starter button or lever 88 is provided. It is conveniently mounted upon a pivot pin 89 carried by the plate 67'. The starter lever 88 has an end 90 engageable with the base of the outer end of the rocker 58. As the button 88 is rotated inwardly, the rockers 57 and 58 are moved until the springs 82 and 83 pass beneath the axes of the pins 62 and 63. Accordingly, the clutch 51 then snaps to the position of FIG. 4. The tool shaft 21 is accordingly rotated and the tool holder begins its spiral advancement.

When the tap 12 has reached a predetermined depth the clutch member 51 is shifted to engage the reverse drive member 27. For this purpose, a central actuator rod 91 is provided. The upper reduced portion of this rod extends slidably through a bore 92 in the tool shaft 21. The rod 91 transversely mounts a pin 93 at its upper end. The ends of the pin 93 project past elongate clearance slots 95 and 96 of the shaft 21 and into ends of a diametric aperture 94 of the clutch 51. Accordingly, by pulling the rod 91 downwardly, the clutch 51 can be caused to engage the reverse drive member 27.

In order to pull the rod 91 downwardly relative to the clutch 51, when the tapper 21 reaches a preselected depth, an abutment nut 97 (FIGS. 6 and 7) is provided. The nut 97 is mounted at an adjusted position on the lead screw 14b. The nut 97 has a split 98 that enables it to be constricted about the lead screw, as by a draw screw 99. The nut 97 moves downwardly with the lead screw 14b until it engages a transverse pin 100 connected to the lower end of the actuator rod 91. The pin 100 projects through clearance slots 101 and 102 in the tool shaft 21 and clearance slots 103 and 104 of the lead screw 14b.

The clutch 51 is then pulled downwardly toward the position of unstable central balance of FIG. 8. At this position, the clutch 51 is yet in engagement with the forward drive member 32. Hence, it is positively carried beyond the central balanced position, whereupon the clutch 51 shifts with snap action to engage the reverse drive member 27. The tool shaft 21 accordingly reverses its rotation and the tapper 21 spirally retracts, as illustrated in FIG. 6.

Upon adequate retraction, the clutch 51 is disconnected from the reverse drive member 27. For this purpose, an abutment ring 105 is provided. This ring is mounted within the bore of the lead screw 14b by the aid of a snap ring 106. The abutment ring 105 as it moves upwardly ultimately engages the lower end of the actuating rod 91 and moves the clutch 51 upwardly to the neutral position of FIG. 1. The cycle terminates.

The button 88 can be actuated manually. However, a solenoid 107 makes it possible to actuate the button by remote control or by an automatic mechanism.

The spindle 18 may be one of a series of spindles mounted on a turret head 108, in turn reciprocably mounted by guides 109.

The turret head can be so adjusted as to cause the tool 12 to be but a slight distance above the hole 11 at the start of the cycle. The required depth of travel may readily be determined by adjusting the abutment nut 97. Access openings 110 (FIG. 6) in the lower end of the body 15 are provided for this purpose.

A different spiral pitch is easily obtained by replacing the tool holder 14 and the lead nut 20. To do this, the transverse pin 100 of the actuating rod 91 is removed through the access openings 110. A set screw (not shown) for the lead nut 20 is then loosened. The parts then can be slipped out of the lower body opening 19. The abutment nut 97, being smaller than the lead nut 20, clears the inner edge of the shoulder 111 against which the lead nut 20 is placed.

To change tools having the same spiral pitch, only the adapter part 14a need be removed from the lead screw part 14b.

The inventor claims:

1. In an automatic attachment to a power spindle of a machine tool: a body, one end of the body having provisions for non-rotary attachment to the tool in circumscribing relationship about its said power spindle with the end of the spindle terminating short of the other end of the body; a lead nut mounted at the other end of the body opposite the spindle and at the axis of said spindle as determined by said attachment provisions; a lead screw received in the lead nut and having a tool holding part at its outer end; a tool shaft mounted by the body for rotation about said axis and in line with said spindle, said tool shaft having an axially slidable driving connection with said lead screw; said tool shaft being confined against axial movement; a pair of spaced opposed drive members mounted by said body for angular movement about said axis; means deriving power from said spindle for oppositely rotating said drive members;

a clutch rotatably coupled to said tool shaft and slidable along the tool shaft and between said drive members to engage and be driven thereby; and means operated upon predetermined spiral movement of said lead screw for moving the clutch between its drive members.

2. The combination as set forth in claim 1, in which said lead nut is detachably secured to said body at said other body end, and in which said lead screw is axially separable from said tool shaft at said end, said lead screw being held to said body only by said lead nut.

3. In an automatic attachment to a power spindle of a machine tool: a body; a tool holder; means confining the tool holder to spiral advancement and retraction with respect to said body; a tool shaft for rotating the tool holder and mounted for rotation by the body; a pair of drive members having provisions for coupling to the spindle for continuous rotation thereby in opposite directions; a clutch coupled to the tool shaft and movable between alternate limits to engage and be driven by the respective drive members; bistable means movable in a path and coupled to said clutch for urging the clutch toward either of said limits, said bistable means having a central unstable balanced position in which said clutch is yet in engagement with one of said drive members; first abutment means operated upon predetermined spiral advancement of the tool holder moving said clutch away from one limit and to and beyond said central position whereupon the bistable means shifts the clutch to its opposite limit; and second abutment means operated upon predetermined spiral retraction of said tool holder for moving the clutch away from its other limit and toward a neutral position short of said central unstable balanced position whereby a cycle is concluded upon arrival of said clutch to said neutral position.

4. The combination as set forth in claim 3 in which the clutch is operatively in engagement only with the driving member that causes spiral advancement of the tool holder when the clutch is in its central position.

5. The combination as set forth in claim 4 together with means for initiating the cycle by moving the clutch from its neutral position and toward said one limit.

6. The combination as set forth in claim 4 in which said tool shaft is axially fixed, there being an axially slidable coupling between the tool holder and the tool shaft; there being an axially slidable coupling between the clutch and said tool shaft; an actuator rod extending through the tool shaft and rotatable therewith, said rod being connected at its upper end to said clutch, and engaged by said second abutment means at the other end.

7. The combination as set forth in claim 4 in which the bi-stable mechanism includes a pair of rockers; means pivotally mounting the rockers for tilting movement about substantially parallel axes located on opposite sides of the clutch; said rockers having pins located between the axes and engageable with the clutch during rotation thereof; and spring means having ends respectively engaging the rockers at places located outwardly beyond said axes.

8. In an automatic attachment to a power spindle of a machine tool: a body having an opening at one end; a lead nut mounted at said one end; a lead screw received in the lead nut and having provisions for mounting a tool at its outer end; an abutment nut mounted at a selected position at the inner end of the lead screw; a shaft mounted in the body for rotation about the axis of the lead screw; means forming an axially slidable coupling between the lower end of the shaft and the lead screw; a pair of driving members mounted in the body and having provisions accessible at the other end of the body for attachment to said power spindle and for continuous rotation thereby in opposite directions; a clutch carried at and coupled to the upper end of the shaft, said clutch being axially slidable along the shaft in opposite directions to engage the driving members respectively; said clutch being movable to a neutral position in which neither driving member is engaged; a pair of rockers; means pivotally mounting the rockers for movement about parallel axes located on opposite sides of the clutch; said rockers having means engageable with the clutch to shift the clutch between said driving members as the rockers are tilted in unison about their respective axes; a pair of tension springs each having ends anchored on the respective rockers at places located beyond the respective axes of the rockers to determine a central unstable balanced position of the rockers and clutch; the springs being located on opposite sides of the clutch; said springs urging the clutch from said central unstable balanced position toward engagement with one or the other of said driving members; said clutch being yet in engagement with that driving member which is operative to cause advancement of the tool holder when said clutch is in said central balanced position; a rod slidable in the shaft and connected to said clutch member, said rod having a pin at its lower end in the path of movement of said abutment nut as said lead screw is advanced whereby the clutch is moved to and beyond said central balanced position for engagement with the opposite driving member; said lead screw having a part engaging said rod upon predetermined retraction of said lead screw for moving said clutch out of engagement from said opposite driving member.

9. The combination as set forth in claim 8 together with a solenoid operated member acting upon one of said rockers to move said clutch from said neutral position to and beyond said central balanced position.

References Cited in the file of this patent

UNITED STATES PATENTS

| 376,032 | Gielow | Jan. 3, 1888 |
| 2,154,793 | Weber | Apr. 18, 1939 |
| 3,058,128 | Derby | Oct. 16, 1962 |

FOREIGN PATENTS

| 259,815 | Great Britain | Oct. 21, 1926 |